United States Patent
Chambers

[15] 3,636,640
[45] Jan. 25, 1972

[54] INCLINED PLANE

[72] Inventor: Robert F. Chambers, 504 Beverly Road, Newark, Del. 19711

[22] Filed: May 5, 1970

[21] Appl. No.: 34,750

Related U.S. Application Data

[63] Continuation-in-part of Ser. No. 735,259, June 7, 1968, Pat. No. 3,520,981.

[52] U.S. Cl. .................................................... 35/19 R
[51] Int. Cl. ....................................................... G09b 23/06
[58] Field of Search .................. 35/19 R; 273/121 A, 86 B; 33/206 R

[56] References Cited

UNITED STATES PATENTS 1,935,674  11/1933  Smith ................................ 33/206 R
3,348,844  10/1967  Lemelson ........................ 273/121 A

OTHER PUBLICATIONS

Knott Apparatus Co. Catalog, pp. 117, 118 only, received Jan. 1917

Welch Scientific Co. Catalog, pg. 82 only, received Oct. 1965

Primary Examiner—Harland S. Skogquist
Attorney—Connolly and Hutz

[57] ABSTRACT

Apparatus for determining weight components of mass on inclined plane acting perpendicular and parallel to incline comprises adjustable inclined plane with mass supported upon plane. Force-applying structure is provided for forcing mass in upward direction perpendicular to inclined plane until mass just moves away from plane. Force-applying structure also forces mass in upward direction parallel to inclined plane until mass just moves in that direction.

5 Claims, 5 Drawing Figures

PATENTED JAN 25 1972

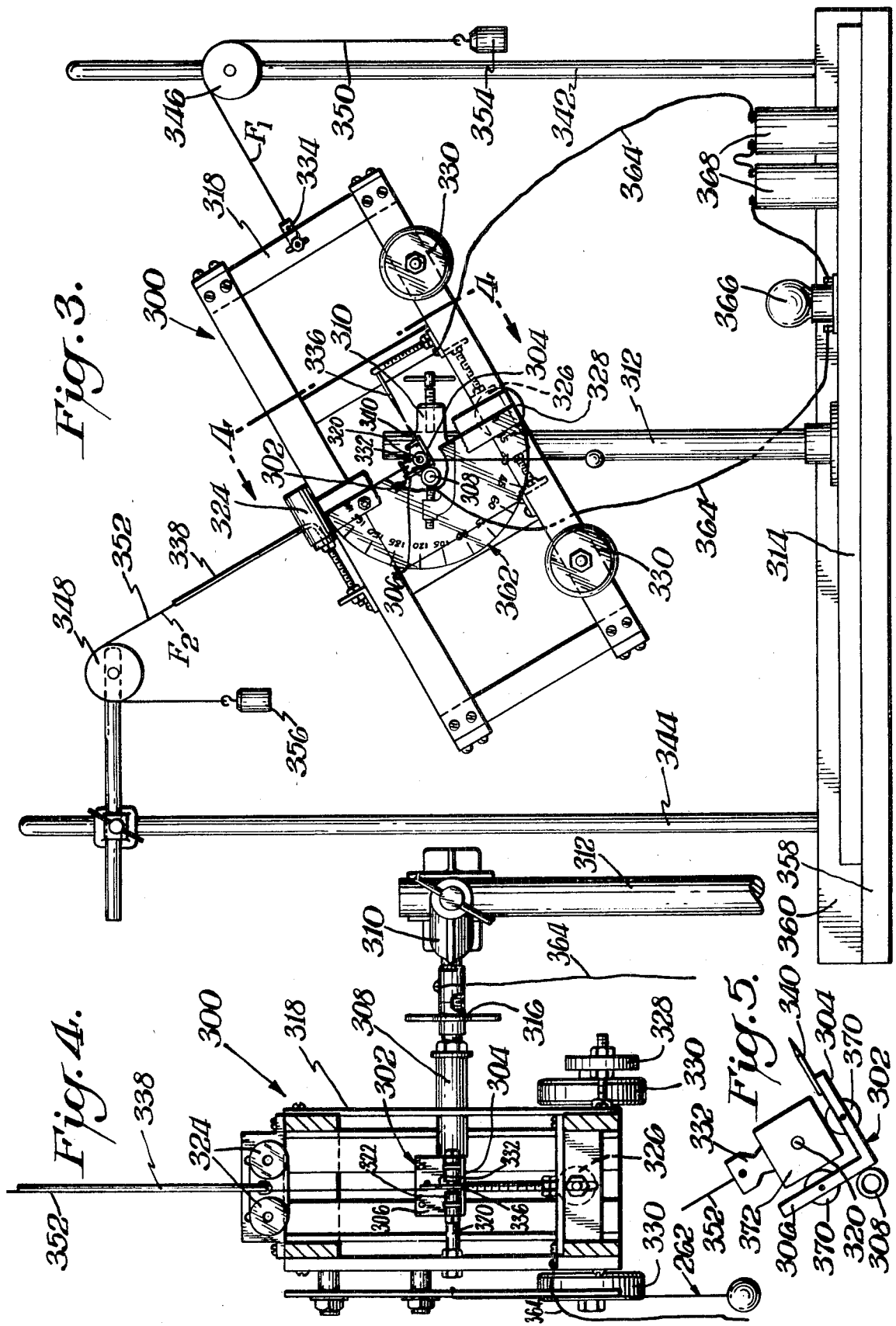

INCLINED PLANE

CROSS-REFERENCE TO RELATED APPLICATION

The present application is a continuation-in-part application of applicant's copending application Ser. No. 735,259, filed June 7, 1968 and now U.S. Pat. No. 3,520,981.

BACKGROUND OF THE INVENTION

The present invention relates to apparatus for classroom physics experiments, and more particularly to an apparatus for demonstrating the forces associated with a mass on an incline.

Prior to the present invention numerous structural arrangements have been proposed for the purpose of demonstrating phenomena associated with the classroom instruction of physics. Several arrangements have been proposed for specifically demonstrating the forces associated with a mass on an incline. However, for the most part, these arrangements are characterized by their complex mode of operation as well as the expense of their overall construction. Financially, most of these arrangements are beyond the reach of many school systems, and their complex nature results in lack of interest on the part of the students. Often, students lose interest during an inclined plane experiment because of the lengthy procedures necessary to achieve a desired result. Thus, the teaching profession has long sought equipment for inclined plane experiments which is reliable, inexpensive and simple to use.

Accordingly, it is an object of the present invention to avoid the above disadvantages and provide an apparatus for demonstrating the forces associated with a mass on an incline, the apparatus being simple to operate and maintain as well as inexpensive and reliable.

SUMMARY OF THE INVENTION

In accordance with the present invention an apparatus is provided for determining the weight components of a mass on an inclined plane acting perpendicular and parallel to the incline of the plane. The apparatus includes an adjustable inclined plane and a mass which is supported upon the plane. Structure is provided for applying a force to the mass in an upward direction perpendicular to the inclined plane until the mass just moves away from the plane. Structure is also provided for applying force to the mass in an upward direction parallel to the inclined plane until the mass just moves in that direction.

In one embodiment of the present invention the mass includes front and rear wheels engaging the inclined plane, and the mass is constructed of electrically conductive material. The inclined plane may include an electrically conductive strip upon which the wheels of the mass rest. An electrically conductive stop on the strip prevents the mass from riding down the incline. A series electrical circuit interconnects the mass stop, and strip, and an indicator is provided in the circuit for indicating a break therein when the mass is out of contact with the stop and the strip.

In another embodiment of the present invention the mass comprises a framework with a horizontal cylindrical support member secured thereto and arranged to engage the inclined plane for supporting the mass upon the plane. Weights are adjustably secured to the framework for adjusting the center of gravity of the mass so that it lies along the longitudinal axis of the horizontal cylindrical support member. The net effect is that the size of the mass is reduced to the dimensions of the horizontal support member. The only requirement for the surface area of the inclined plane is that it be large enough to support the horizontal member.

The horizontal cylindrical support member may include roller bearings. Also, the structure for applying force to the mass in an upward direction perpendicular to the inclined plane may include a lug rotatably mounted upon the horizontal support member. The lug functions as an attaching device for securing a force to the mass that acts in a direction perpendicular to the inclined plane. Moreover, the mass may include first and second pointers arranged at right angles to one another for aligning the direction of the force-applying structure so that forces are applied in directions perpendicular and parallel to the inclined plane. A third pointer attached and parallel to the incline of the plane cooperates with either the first or second pointer to ensure that the forces are applied perpendicular and parallel to the incline of the plane.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 3 is a front elevational view of another inclined plane apparatus according to the present invention;

FIG. 4 is a sectional view taken along line 4—4 of FIG. 3; and

FIG. 5 is a fragmental front elevational view of another inclined plane apparatus according to the present invention.

DETAILED DESCRIPTION OF THE INVENTION

Figure 1:
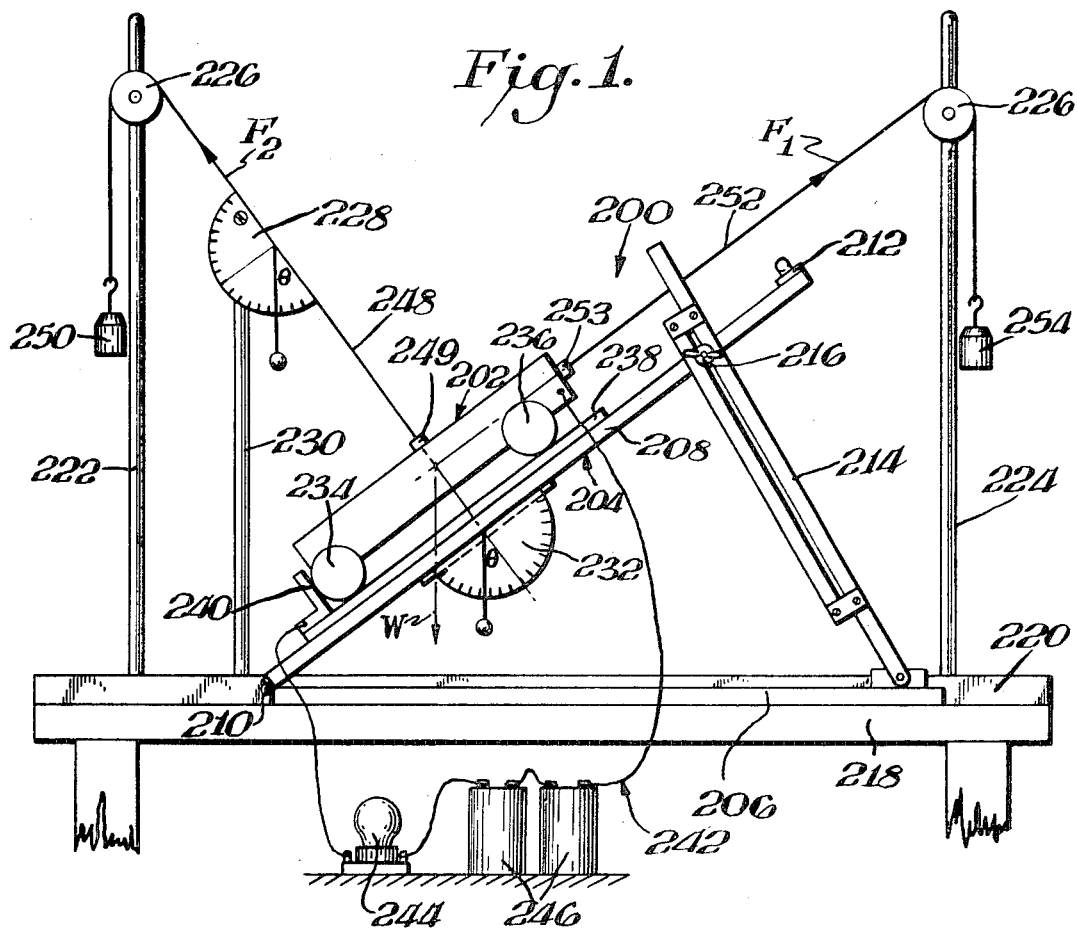
FIG. 1 is a front elevational view of an inclined plane apparatus according to the present invention.
Figure 2:
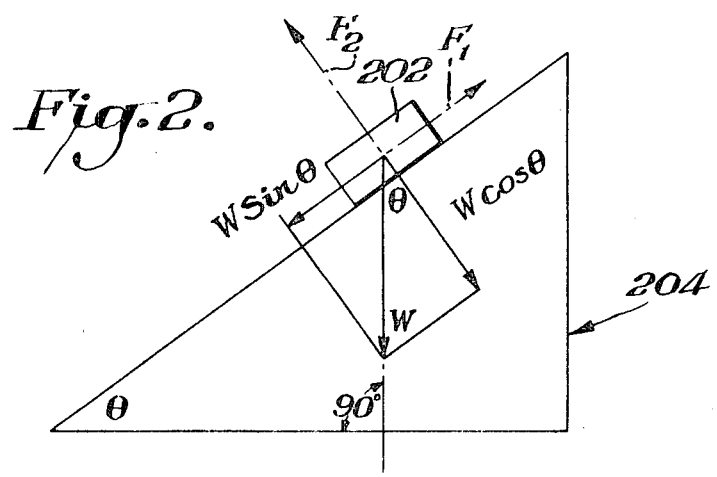
FIG. 2 is a diagram of the force associated with the apparatus of FIG. 1.

FIGS. 1 and 2 illustrate an inclined plane apparatus 200 according to the present invention. In essence, the apparatus 200 is utilized for determining the weight components of a mass 202 on an inclined plane 204 which components act perpendicular and parallel to the incline of the plane. The inclined plane 204 comprises a base member 206 with a plane member 208 hinged thereto at 210. The upper end of the plane member 208 carries a level 212 for determining the approximate level of the plane and making any necessary adjustments. The angle of inclination of the plane member 208 is set by a pair of struts 214 hinged at their lower ends to the base member 206 and adjustably secured to the plane 208 by fasteners 216, one on each side of the plane member. The inclined plane 204 rests on a support table 218 with the rear side of the base member 206 flush against a guide plate 220 anchored to the support table.

A pair of support rods 222, 224 are secured to the support table 218 on opposite sides of the inclined plane 204. Each rod carries a pulley 226 adjustably secured thereto. The apparatus 200 also includes an adjustable protractor 228 connected to a movable support 230. Another protractor 232 is anchored to the under portion of the plane member 208 for determining the angle of incline of the plane.

The mass 202 has front and rear wheels 234 and 236, respectively, which rest upon a pair of spaced apart electrically conductive strips 238, and is maintained in equilibrium by an electrically conductive stop member 240 fixed to the strips 238, as shown in FIG. 1. The mass 202 including the front and rear wheels is formed of electrically conductive material. Moreover, a series electrical circuit 242 interconnects an indicator lamp 244 and power source 246 with the mass 202, strips 238 and stop 240. As can readily be understood, when the wheels of the mass are in contact with either the strips 238 or the stop 240 the indicator lamp 244 is energized but when the wheels are out of contact with both the strips and stop the circuit is broken and the indicator lamp does not light.

The present inclined plane apparatus 200 operates in the following manner to determine the weight components of a mass on an inclined plane which components act perpendicular and parallel to the incline. First, the inclination of the plane member 208 is set at any arbitrary angle which angle is indicated by the protractor 232. When the plane member 208 is level the fasteners 216 are tightened to securely anchor the struts 214 to the plane member. The mass 202 is then positioned on the inclined plane 204 in static equilibrium with its wheels 234 and 236 resting on the electrically conductive strips 238. Moreover, the front wheels 234 of the mass 202 abut the stop 240.

The next step involves the application of force $F_2$ to the mass 202 in a direction perpendicular to the incline of the plane. This is accomplished by a string 248 or similar flexible member attached to the mass at 249 and extending upwardly and over the pulley 226 on the support rod 222. The proper angle of the string 248 is obtained in the following manner. First, the protractor 228 is adjusted to an angle equal to the angle of inclination of the plane. The support 230 for the protractor is then moved into position so that the edge of the protractor is directly beneath the string 248. While pressing the base member 206 of the inclined plane 204 against the guide plate 220 the inclined plane is moved laterally until the edge of the protractor 228 is parallel to the string 248. When this condition is satisfied, the string is perpendicular to the inclined member 208 of the plane 204. Weights 250 are then applied to the string 248, in a manner described below.

Force $F_1$ is applied to the mass 202 in a direction parallel to the incline of the plane 204. This is accomplished by a string 252 anchored to the mass at 253 and extending upwardly over the pulley 226 on the support rod 224. The string 252 is made parallel to the inclined member 208 by adjusting the pulley 226 on rod 224 until the string is parallel to the inclined member 208. Weights 254 are then attached to the end of the string 252, in a manner described below.

Preferably, forces $F_1$ and $F_2$ are gradually increased by hanging weights, such as 250 and 254, from the strings 248 and 252 until the force $F_2$ is slightly less than that needed to lift the mass 202 free of the inclined plane 204, and the force $F_1$ is just large enough to pull the front wheels 234 of the mass away from the stop 240, as detected by the eye. Under these conditions, the indicator lamp 244 is energized. Force $F_2$ is then gradually increased until the indicator lamp goes out. This indicates that the mass 202 is out of contact with the electrically conductive strips 238 and the stop 240. Next, the force $F_1$ is gradually reduced until the indicator lamp lights, which indicates that the front wheels 234 of the mass have contacted the stop 240 to complete the circuit. The last adjustment of force $F_1$ is followed by an increase in force $F_1$ until the indicator lamp goes out. The weights applied to strings 248 and 252 are then measured and compared with the theoretical values computed by utilizing the actual weight of the mass and the incline of the plane.

FIGS. 3 and 4 illustrate another embodiment of the present invention for determining the weight of components of a mass 300 on an adjustable inclined plane 302. As in the embodiment illustrated in FIGS. 1 and 2, the weight components determined act perpendicular and parallel to the incline of the plane. The adjustable inclined plane 302 has an inclined portion 204 with a right angle stop portion 306 connected thereto. These portions of the inclined plane are adjustably secured to a horizontal support 308 connected by a clamp 310 to a support rod 312. The support rod is anchored to a base member 314. The angle of inclination of the inclined portion 304 is made adjustable by the locking connection 316 in the horizontal support 308.

The mass 300 includes a framework 318 having a horizontal cylindrical support member 320 secured thereto and arranged to engage the inclined plane for supporting the mass upon the plane, as shown in the drawing. The cylindrical support member 320 has rotatable bearings 322 that engage the inclined plane 302. Weights 325, 326 and 328 are adjustably secured to the framework 318 for adjusting the center of gravity of the mass so that it lies along the longitudinal axis of the horizontal cylindrical member 320 at a location midway between the long sides of the framework. The weights 324 and 326 are adjustable in both horizontal and vertical directions when the wheels 330 of the mass 300 are resting upon a horizontal support. By appropriately adjusting the weights 324 and 326 the horizontal and vertical coordinates of the center of gravity of the mass 300 are made to coincide with the longitudinal axis of the horizontal cylindrical support member 320. Weight 328 is manipulated to adjust the third coordinate of the center of gravity of the mass 300 so that it is midway between the long sides of the framework 318.

A lug 332 is rotatably secured to the horizontal cylindrical support member 320 at a position midway between the long sides of the framework 318 which position is between the roller bearings 322. As explained more fully below, the lug 332 has an opening therein for attaching a force which is perpendicular to the incline of portion 304. A second lug 334 is rotatably secured to the framework 318 of the mass 300 for the purpose of attaching a second force to the mass 300 which is parallel to the incline of the portion 304. The lug 334 is positioned so that the direction of a correct force applied thereto passes through the center of gravity of the mass 300.

A pair of pointers 336 and 338 arranged at right angles to one another is secured to the framework 318 of the mass 300. The pointer 336 cooperates with a pointer 340 on the inclined plane 302. The pointer 336 is horizontally disposed when the wheels of the framework 318 of the mass 300 rest upon a horizontal support. The pointer 340 on the inclined plane is parallel to the incline of the portion 304. Accordingly, when the pointers 336 and 340 are in alignment the mass 300 can be said to be positioned at an inclination equal to the incline of the plane. Pointer 338 on the framework 318 serves as a reference for applying a force to the mass 300 which acts perpendicular to the incline of the plane.

Support rods 342, 344, adjustable pulleys 346, 348, strings 350, 352, and weights 354 and 356 are provided for applying forces to the mass 300 for the purpose of measuring the component forces of the mass 300 which act perpendicular and parallel to the incline of the plane.

In operation, the base member 314 which serves to support the inclined plane 302 is positioned upon a support table 358 so that the support rod 312 attached to the base 314 is approximately midway between the support rods 342 and 344. For reasons explained more fully below, the base 314 is positioned against a guide plate 360 anchored to the support table 358. In the next step the locking connection 316 is released and the angle of inclination of the inclined plane is set to any arbitrary value. The locking connection 316 is then tightened to fix the inclination at the arbitrary value. The mass 300 is supported upon the inclined plane 302 by the horizontal cylindrical support member. The roller bearings of the horizontal support member engage the portions 304 and 306 of the inclined plane. The mass is rotated about the axis of the horizontal support member 320 until the pointer 336 is directly opposite the pointer 340 on the inclined plane 302. Force is then applied to the mass by attaching weights 354 to the string 350 connected to the mass 300 by the lug 334. When the string is taut the pulley 346 is moved vertically on its support rod 342 until the pointers 336 and 340 are approximately in coincidence. Weights 356 are then attached to string 352 until that string is taut. The base support member 314 is then shifted laterally while in engagement with the stationary guide plate 360 until the pointers 336 and 340 are in exact coincidence. The protractor and plumb bob assembly 362 secured to the framework 318 now registers the angle of inclination of the plane, which angle is 30° in the example illustrated in the drawing. The pulley 348 is adjusted vertically on its support rod 344 until the string 352 is parallel to the pointer 338. When the above conditions are satisfied the direction of the forces applied to the mass 300 are perpendicular and parallel to the incline of the plane. The weights 354 and 356 are then increased until the mass 300 is out of contact with the inclined plane 302. The weights applied to the strings 350 and 352 are then measured and compared with the theoretical values computed by utilizing the actual weight of the mass and the incline of the plane.

Preferably, the framework 318 of the mass 300 as well as the adjustable inclined plane 302 are constructed of electrically conductive material. The horizontal cylindrical support member 320 is also constructed of similar material. A series electrical circuit 364 interconnects an indicator lamp 366 and power source 268 with the framework 318, support member 320 and the adjustable inclined plane 302. As can readily be understood, when the support member 320 is in contact with the inclined plane 302 the indicator lamp 366 is energized but when the member 320 is out of contact with the inclined plane 302 the circuit is broken and the indicator lamp does not light. The circuitry of the embodiment of the invention illustrated in FIGS. 3 and 4 may be utilized in the same manner as described above in conjunction with the embodiment of the invention illustrated in FIGS. 1 and 2.

The present inclined plane apparatus enables one to accurately measure the components of a mass which act perpendicular and parallel to the incline of a plane. The horizontal cylindrical support 302 is surrounded by the overall mass 300. The effect is to reduce the size of the mass to the dimensions of the horizontal support member and reduce the size of the plane to that of a postage stamp.

An alternate apparatus for measuring the weight components of mass 300 which act perpendicular and parallel to the incline of portion 304 is to include roller bearings 370 with the portions 304 and 306 of the inclined plane 302, as shown in FIG. 5. The roller bearings 322 associated with the horizontal cylindrical support 320 of the apparatus of FIGS. 3–4 are replaced by a pair of rotatably mounted rectangular blocks 372. The blocks 372 may be locked in position after the pointers 336 and 340 are brought into alignment.

What is claimed is:

1. Apparatus for determining the weight components of a mass on an inclined plane acting perpendicular and parallel to the incline of the plane comprising an adjustable inclined plane, a mass including a framework having a horizontal cylindrical support member secured thereto with its longitudinal axis passing through the center of gravity of the mass and arranged to engage the inclined plane for supporting the mass upon the plane, means for applying forces to the mass in an upward direction perpendicular to the incline of the plane and in an upward direction parallel to the incline of the plane, and indicator means associated with the mass for indicating when the forces applied thereto are perpendicular and parallel to the incline of the plane.

2. Apparatus as in claim 1 wherein the indicator means includes first and second pointers displaced 90° from one another for aligning the direction of the force-applying means whereby forces may be applied in directions perpendicular and parallel to the incline of the plane.

3. Apparatus as in claim 2 including a third pointer fixed relative to the inclined plane and arranged in a direction parallel to the incline of the plane, the third pointer cooperating with one of the other pointers whereby when these two pointers are in exact alignment with one another one of the forces applied to the mass acts parallel to the incline of the plane.

4. Apparatus as in claim 1 wherein the mass and the inclined plane are constructed of electrically conductive material and the inclined plane includes and electrically conductive stop for preventing the horizontal cylindrical support member from sliding down the incline, and a series electrical circuit interconnecting the mass, incline and stop, the circuit including means for indicating a break therein when the mass is out of contact with the stop and the incline.

5. Apparatus as in claim 1 wherein the horizontal cylindrical support member includes a bearing member having a circular cross section.

* * * * *